United States Patent [19]
Ando

[11] Patent Number: 5,684,780
[45] Date of Patent: Nov. 4, 1997

[54] OPTICAL PICKUP DEVICE HAVING OPTICAL ELEMENT EXHIBITING POLARIZED LIGHT SELECTIVITY LOADED THEREON AND OPTICAL APPARATUS HAVING THE OPTICAL PICKUP DEVICE LOADED THEREON

[75] Inventor: Nobuhiko Ando, Tokyo, Japan

[73] Assignee: Sony Corporation, Tokyo, Japan

[21] Appl. No.: 633,477

[22] Filed: Apr. 17, 1996

[30] Foreign Application Priority Data

Apr. 18, 1995 [JP] Japan ................... 7-092834

[51] Int. Cl.⁶ ............................................. G11B 7/135
[52] U.S. Cl. ...................... 369/110; 369/112; 369/44.41
[58] Field of Search .................................. 369/112, 110, 369/111, 103, 109, 44.12, 44.11, 44.14, 13, 44.41

[56] References Cited

U.S. PATENT DOCUMENTS

| | | | |
|---|---|---|---|
| 5,016,234 | 5/1991 | Nakamura et al. | 369/44.14 |
| 5,105,410 | 4/1992 | Maeda et al. | 369/44.37 |
| 5,307,335 | 4/1994 | Komiya | 369/110 X |
| 5,337,300 | 8/1994 | Takishima et al. | 369/110 X |
| 5,404,490 | 4/1995 | Matsubayashi et al. | 369/110 X |

FOREIGN PATENT DOCUMENTS

| | | |
|---|---|---|
| 0 318 912 | 6/1988 | European Pat. Off. . |
| 0 273 356 | 7/1988 | European Pat. Off. . |

OTHER PUBLICATIONS

*O plus E*, Mar. 1991 issue, pp. 86–90.

Primary Examiner—Muhammad N. Edun
Attorney, Agent, or Firm—Limbach & Limbach L.L.P.

[57] ABSTRACT

An optical pickup device having polarization selective optical components on its light path for splitting the incident light into plural light beams having different polarized states for generating a variety of error signals based upon the plural split light beams, and an optical apparatus on which is mounted the optical pickup device.

29 Claims, 12 Drawing Sheets

OPTICAL PICKUP DEVICE HAVING OPTICAL ELEMENT EXHIBITING POLARIZED LIGHT SELECTIVITY LOADED THEREON AND OPTICAL APPARATUS HAVING THE OPTICAL PICKUP DEVICE LOADED THEREON

BACKGROUND OF THE INVENTION

1. Field of the Invention

This invention relates to an optical pickup device and a photodetector device suitably employed for a magneto-optical disc apparatus or an optical disc apparatus. More particularly, it relates to such an optical pickup device or photodetector device which, by employing an optical element exhibiting polarized light selectivity, allows a reduction in the number of component parts and the optical length of the optical system.

2. Background of the Invention

The optical pickup device, employed in the magneto-optical disc apparatus or an optical disc apparatus, includes an optical system for detecting RF signals from a recording medium, an optical system for detecting focusing errors and an optical system for detecting tracking errors.

Such an optical pickup device includes an outgoing optical system on an outgoing path for causing the light to fall on a recording medium, as shown in FIG. 1. The optical system for the outgoing light is comprised of a light source 1 for a laser beam, a collimator lens 3 arranged on an optical axis between the light source 1 and a recording medium 2, a first beam splitter 4 and a first convex lens 5. The light from the light source 1 is collimated by the collimator lens 3 and transmitted through the first beam splitter 4 so as to be incident on the first convex lens 5 and thereby converged on the recording medium 2.

The optical pickup device also includes an optical system for the return light for detecting the return light reflected back from the recording medium 2. The return optical system is configured for detecting the return light from the recording medium 2 taken out by the first beam splitter 4, and includes, on an optical axis of the return light reflected from the first beam splitter 4, a first half-wave plate 6, a second convex lens 7, a concave lens 8 and a second beam splitter 9. In addition, the return optical system includes a two-segment photodetector 10 for detecting the return light transmitted through the second beam splitter 9 and a four-segment photodetector 12 for detecting the return light reflected by the second beam splitter 9 and transmitted through a cylindrical lens 11.

The return light reflected by the first beam splitter 4 has its plane of polarization rotated 45° by the half-wave plate 8 and is transmitted through the second convex lens 7 and the concave lens 8 of pro-set focal lengths so as to fall on the second beam splitter 9. The return light transmitted through the second beam splitter 9 is directly detected by the two-segment photodetector 10. The return light reflected by the second beam splitter 9 is detected by the four-segment photodetector 12 after astigmatism is produced by the cylindrical lens 11.

The two-segment photodetector 10 detects the tracking error by a push-pull method, while the four-segment photodetector 12 detects the focusing error signal by an astigmatic method. The four-segment photodetector 12 is also utilized for detecting RF signals from the recording medium 2.

The above-described optical pickup device is in need of a large number of component parts since the cylindrical lens 11 is required for detecting focusing error signals and a combination of the first convex lens and the concave lens is required for raising the multiplication factor in detecting the return light by the two-segment photodetector 10 and the four-segment photodetector 12. Thus it has been desired to reduce the number of the component parts and thereby the production cost.

However, if such combination of the first convex lens and the concave lens is employed, the return optical path length is increased, thus obstructing reduction in size of the device. For reducing the size of the device, an optical pickup device whose optical system may be designed with a shorter optical path length has been desired.

In addition to the above-described optical pickup device, there is also known such an optical pickup device employing e.g., a Wollaston polarizing prism. This optical pickup device similarly suffers from an increased number of component parts and an increased optical path length.

In O plus E, March issue, 1991, an optical pickup device that can be constituted with a smaller number of component parts and a shorter optical path length has been proposed by NIPPON ELECTRIC COMPANY LTD. In this optical pickup device, the return light is separated using a polarizable hologram optical element and the separated return light is detected by an light-segment photodetector device. However, this optical pickup device suffers from a drawback that, since the photodetector employed for producing RF signals from the recording medium is divided into eight portions, the signal/nose ratio (S/N ratio) in detecting the RF signals from the recording medium is lowered. In addition, this optical pickup device is difficult to reduce in size because the laser light source or the photodetectors are independent units without being integrated together.

SUMMARY OF THE INVENTION

It is therefore an object of the present invention to provide an optical pickup device which is made up of a smaller number of component parts with a shorter optical path length of the optical system and superior in the S/N ratio in detecting the RF signals from the recording medium, and in which respective component parts can be integrated together.

It is another object of the present invention to provide a photodetector device suitable to be used with such an optical pickup device.

In one aspect, the present invention provides an optical pickup device for reading out a signal from a recording medium by radiating a light beam to the recording medium and by detecting a return light reflected from the recording medium. The optical pickup device includes light emitting means, first beam splitting means arranged on the light path of an incident light radiated by the light emission means and incident on the recording medium for taking out a return light beam from the light path of the incident light, second beam splitting means arranged on the light path of the return light beam split by the first beam splitting means for splitting the return light into two return light beams, first detection means for detecting one of the return light beams split by the second beam splitting means, polarization selective optical means arranged on the light path of the other return light beams split by the second beam splitting means for splitting the other return light beam into plural light beams having different polarized states, and second detection means for detecting the plural light beams split by the optical means.

In another aspect, the present invention provides an optical apparatus for reading out a signal from a recording medium by radiating a light beam to a recording medium and by detecting a return light beam reflected from the recording medium. The optical apparatus includes light emitting means, first beam splitting means arranged on the light path of an incident light radiated by the light emission means and incident on the recording medium for taking out the return light beam from the light path of the incident light, second beam splitting means arranged on the light path of the return light beam split by the first light splitting means for splitting the return light beam into two return light beams, first detection means comprised of a three-segment detector ABC for detecting one of the return light beams split by the second beam splitting means, polarization selective optical means arranged on the light path of the other return light beam split by the second beam splitting means for splitting the other return light beam into a 0 order light beam, a +one order light beam and a −one order light beam having different polarized states, second detection means comprised of a three-segment detector DEF, a detector G and a detector H for detecting the 0-order light beam, +one order light beam and the −one-order light beam having different polarized states, respectively, and arithmetic means for executing arithmetic operations for finding a focusing error signal FE={(a+c)−b}−{(d+f)−e}, a tracking error signal TE=a−c, a photo-magnetic signal MORF=(d+e+f)−(g+h) and an optical signal CDRF=(d+e+f)+(g+h), where a, b, c, d, e, f, g and h denote light volumes detected by said detectors A, B, C, D, E, F, G and H, respectively, In yet another aspect, the present invention provides an optical apparatus for reading out a signal from a recording medium by radiating a light beam to a recording medium and by detecting a return light reflected from the recording medium. The optical apparatus includes light emitting means, first beam splitting means arranged on the light path of an incident light radiated by the light emission means and incident on the recording medium for taking out the return light beam from the light path of the incident light, second beam splitting means arranged on the light path of the return light split by the first light splitting means for splitting the return light beam into two return light beams, polarization selective first optical means for splitting one of the return light beams split by the first optical means into a 0-order light beam, a +one order light beam and a −one-order light beam having different polarized states, first detection means having a first three-segment detector ABC for detecting the +one order light beam split by the first optical means and a second three-segment detector DEF for detecting the −one order light beam split by the first optical means, polarization selective second optical means provided on the light path of the other return light beam split by the second beam splitting means for splitting the other return light beam into a 0-order light beam, a +one order light beam and a −one-order light beam having different polarized states, second detection means having detectors H, I and J for detecting the 0-order light beam, +one order light beam and the −one order light beam as split by the second optical means, and arithmetic means for executing arithmetic operations for finding a focusing error signal FE={(a+c)−b}−{(d+f)−e}, a tracking error signal TE=(a−c)+(d−f), a photo-magnetic signal MORF=g−(h+i) and an optical signal CDRF=g+(h+i), where a, b, c, d, e, f, g and h denote light volumes detected by said detectors A, B, C, D, E, F, G and H, respectively.

With the optical pickup device according to the present invention, the return light from the recording medium is taken off the optical axis by the first beam splitter, while the return light taken by the first beam splitter is split by the second beam splitter. One of return light beams split by the second beam splitter is detected by the first photodetector device. The other return light beam split by the second beam splitter is split by a polarized light selective optical element into a 0 order light beam and ±one order light beams different in polarized state from the 0 order light beam. The 0 order light beam and the ±one order light beams from the optical element are detected by the second photodetector device.

With the optical pickup device according to a modification, the return light from the recording medium is split by the first beam splitter into two return light beams, one of which is split by the grating into the 0 order light beam and ±one order light beams. These ±one order light beams from the grating are detected by the first photodetector device. The other return light beam split by the grating is split by the polarized light selective optical element into a 0 order light beam and ±one order light beams different in polarized state from the 0 order light beam. The 0 order light beam and the ±one order light beams from the optical element are detected by the second photodetector device. With the photodetector device according to the present invention, one of the return light beams split by the beam splitter is detected by a three-segment photodetector made up of photodetector segments A, B and C. The other return light beam, split by the beam splitter, is transmitted through a polarized light selective grating to produce diffracted light beams, of which the 0 order light beam is detected by a three-segment photodetector DEF while the ±order light beams are detected by photodetector segments G and H. The focusing error signal FE, tracking error signal TE, photo-magnetic signal MORF and the optical signal CDRF are obtained in accordance with the equations (1) through to (4).

With a photodetector device, according to a modification, one of the return light beams split by the beam splitter is passed through a grating to produce diffracted light beams, of which the +one order light beam is detected by a three-segment photodetector ABC and the −one order light beam is detected by a three-segment photodetector DEF. The other return light beam, split by the beam splitter, is transmitted through a polarized light selective grating to produce diffracted light beams, of which the 0 order light beam is detected by a photodetector G while the ±order light beams are detected by photodetector segments H and I. The focusing error signal FE, tracking error signal TE, photo-magnetic signal MORF and the optical signal CDRF are obtained in accordance with the equations (5) through to (8).

With the optical pickup device and the optical apparatus according to the present invention, the optical system can be fabricated using a smaller number of component parts, so that production costs may be reduced. In addition, the optical path length of the optical system can be reduced, so that the device or apparatus can be reduced in size, in particular if the components are unified as a compound element.

According to the present invention, since the number of segments of the photodetector employed for detecting the RF signals from the recording medium is small, it becomes possible to improve the S/N ratio in detecting the RF signals from the recording medium.

DESCRIPTION OF THE PREFERRED EMBODIMENTS

Figure 1:
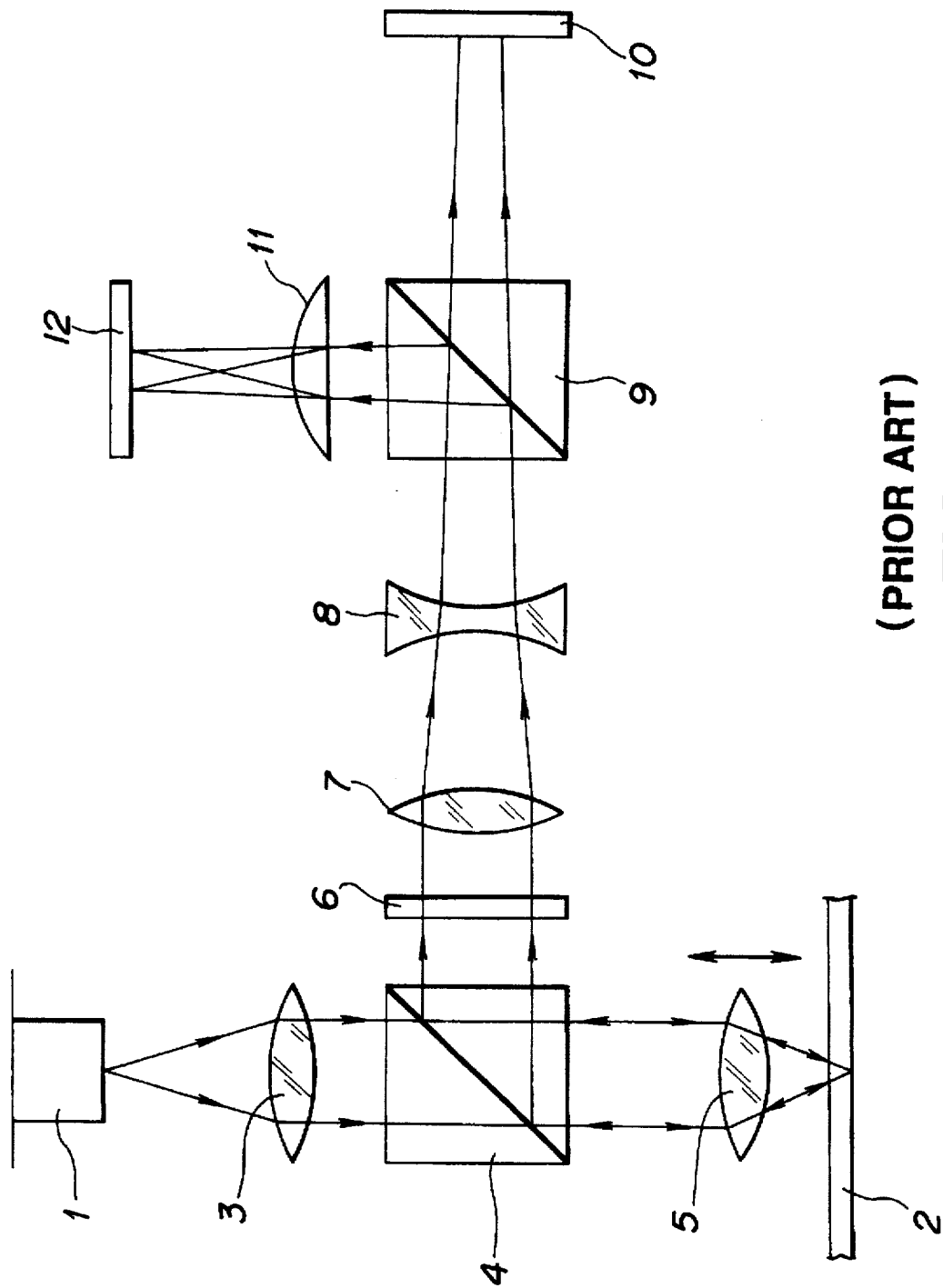
FIG. 1 is a plan view showing an illustrative arrangement of a conventional optical pickup device.

Referring to the drawings, preferred embodiments of the present invention will be explained in detail.

First Embodiment

Figure 2:
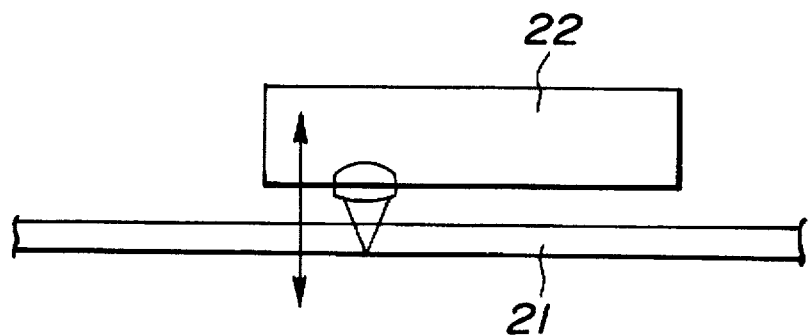
FIG. 2 is a schematic side view showing essential portions of an optical pickup device according to the present invention and an illustrative recording medium.
Figure 3:
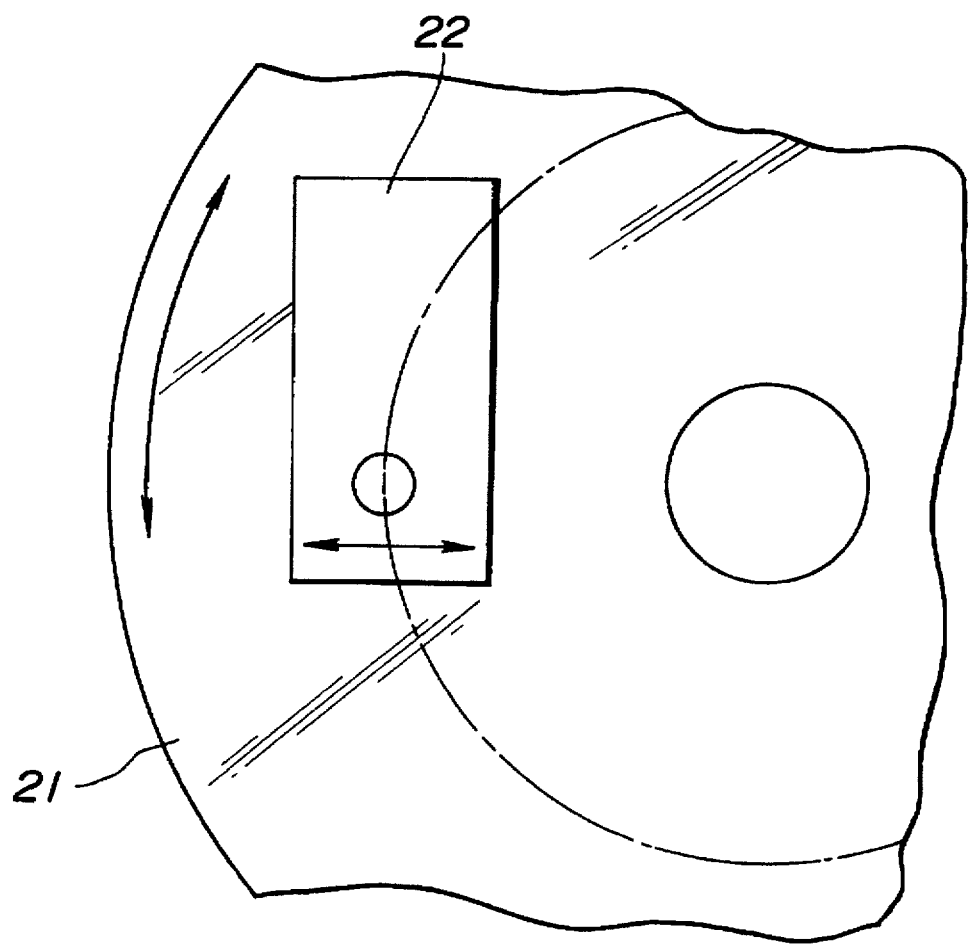
FIG. 3 is a schematic plan view showing the optical pick-up device and the recording medium of FIG. 2, looking from above.

An optical pickup device 22 of the present embodiment is designed so that, by detecting the laser light incident on and reflected back from a recording medium 21, RF signals from the recording medium 21 are read out at the same time as tracking and focusing control operations are performed, as shown in FIGS. 2 and 3.

Figure 4:
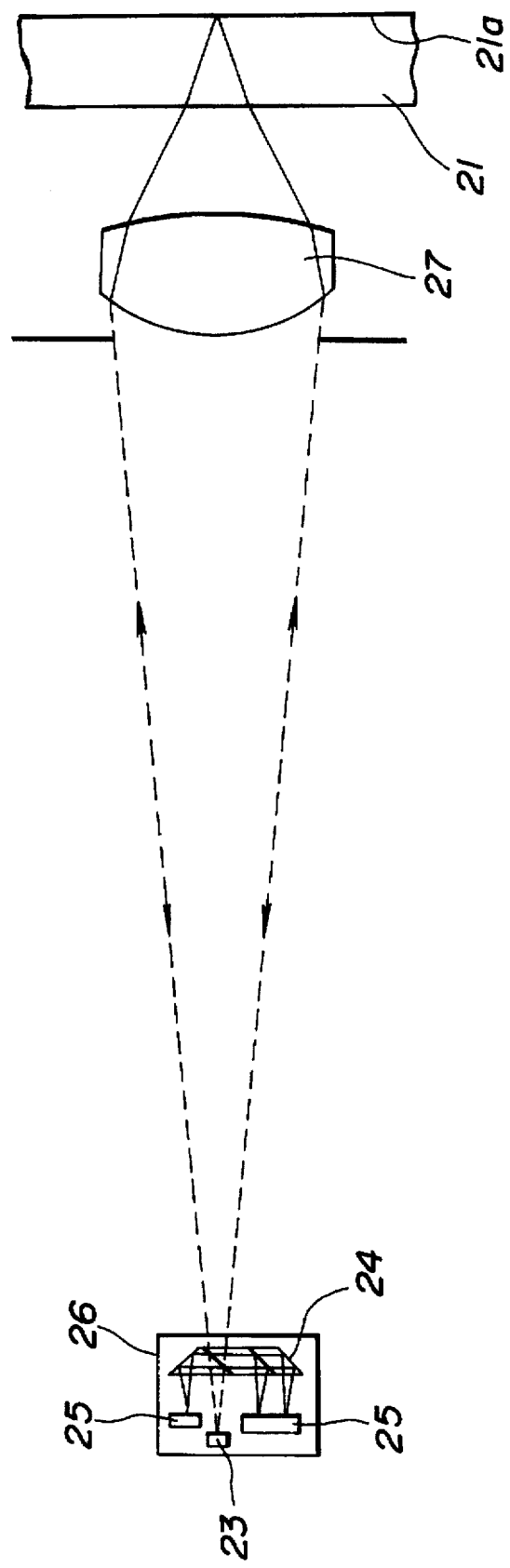
FIG. 4 is a plan view showing an illustrative arrangement of an optical pickup device according to the present invention.

Referring to FIG. 4, the optical pickup device 22 includes a compound element 26 and a lens 27 arranged on the optical axis of the laser light outgoing from the compound element 26 for converging the laser light on a recording surface 21a of the recording medium 21. The compound element 26 is of a unitary construction and is comprised of a light emitting portion 23 for radiating the laser light towards the recording medium compound prism 24 constituting an optical system and a light receiving portion 25 for detecting the return light from the recording medium 26.

Figure 5:
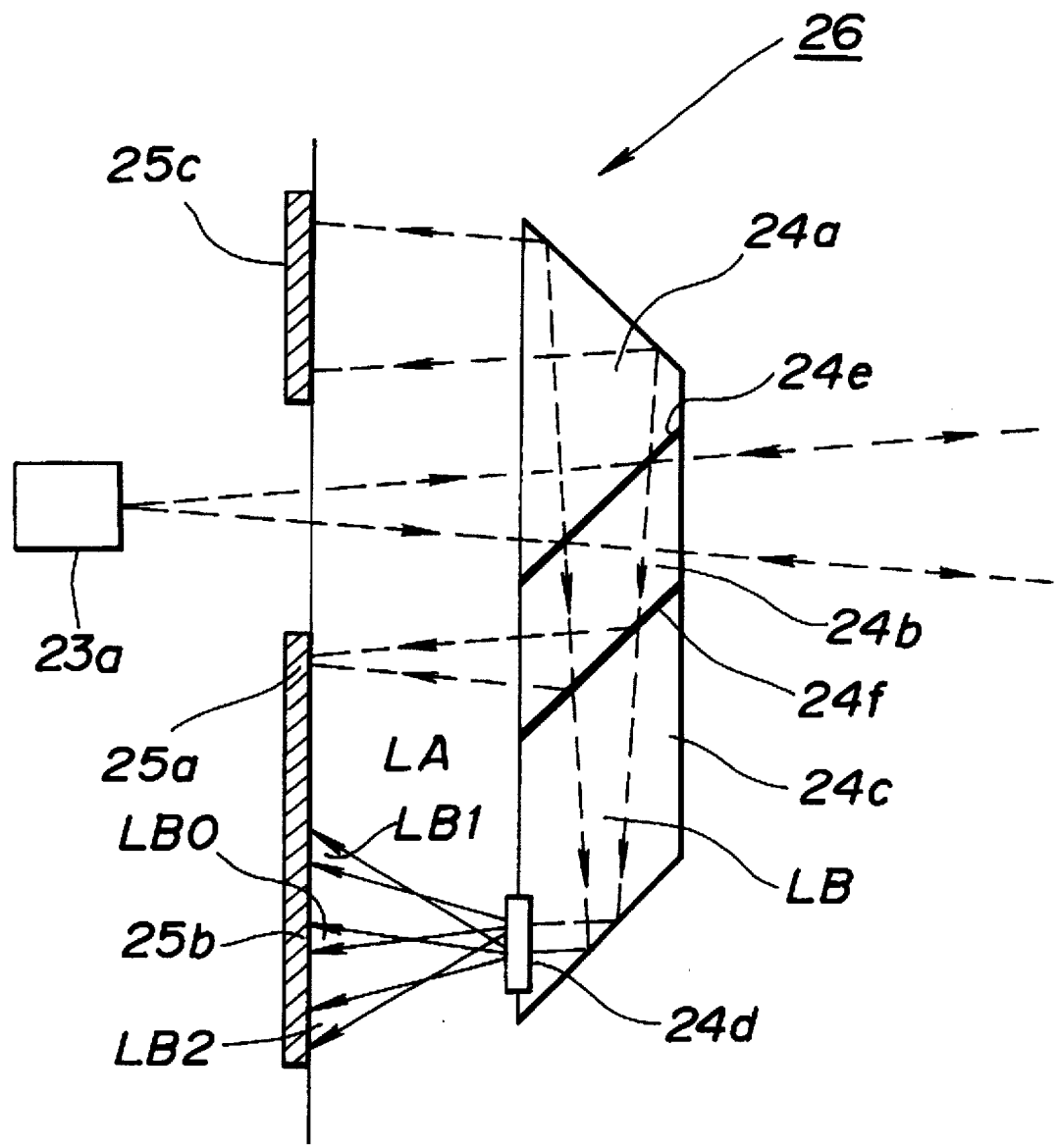
FIG. 5 is an enlarged plan view showing a compound element of the optical pickup device shown in FIG. 4.
Figure 6:
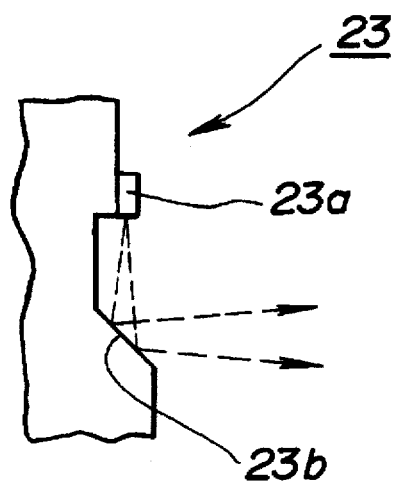
FIG. 6 is a plan view showing an illustrative light emitting portion of the compound element shown in FIG. 5.
Figure 8:
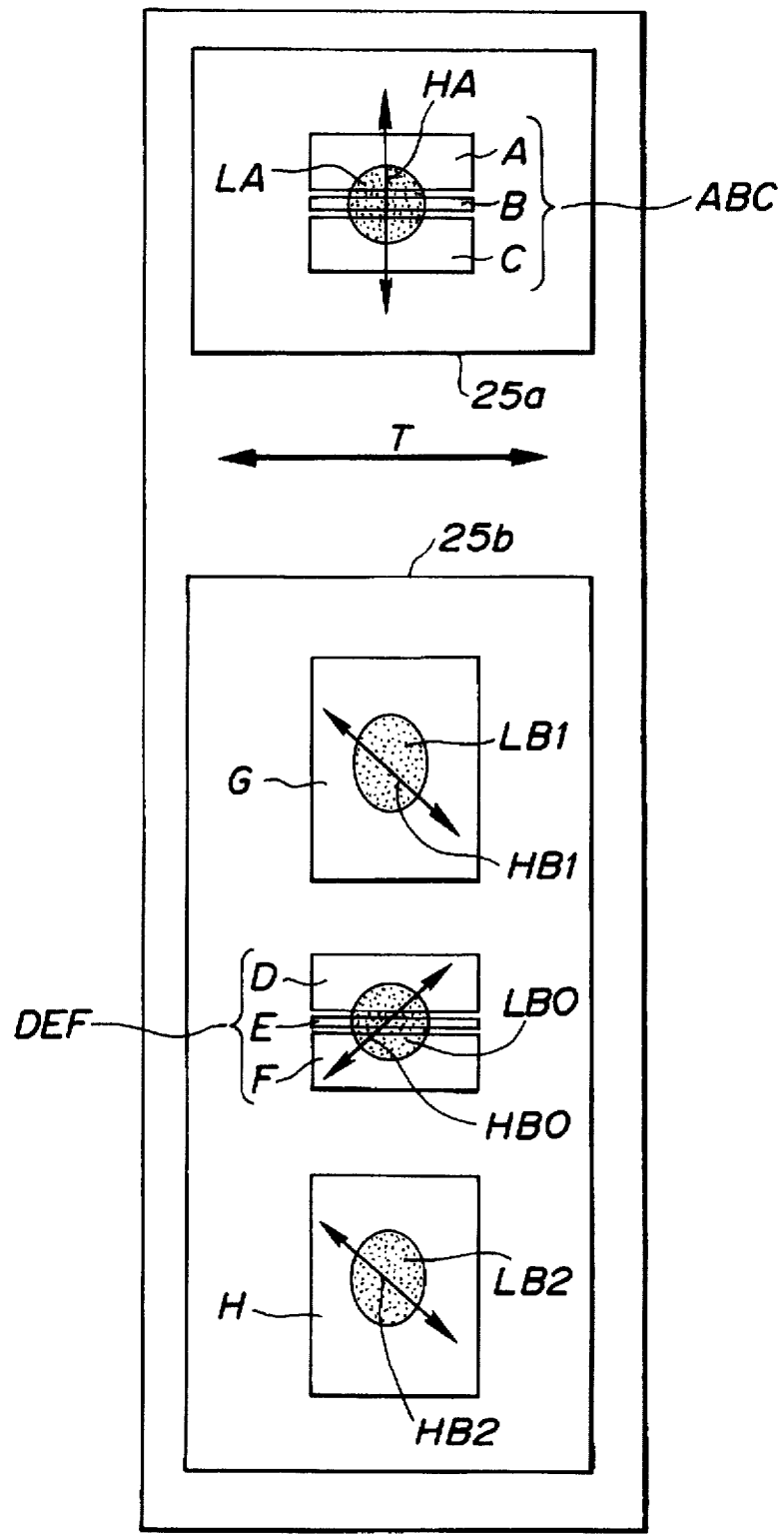
FIG. 8 is an enlarged plan view showing first and second photodetectors of the compound element shown in FIG. 5.

FIG. 5 shows the compound element 26 to an enlarged scale. As shown therein, the compound element 26 includes, as the light emitting portion, a light source 23a radiating the laser light towards the recording medium 21. The outgoing direction of the laser light from the laser light source 23a need not be directly towards the recording medium 21. For example, the laser light from the light source 23a may be reflected by a mirror 23b before being directed towards the recording medium 21, as shown in FIG. 8. If the laser light is directed via the mirror 23b towards the recording medium 21, it becomes possible to increase the degree of freedom of the position of the light source 23a and hence to reduce the size of the compound element 26.

The compound prism 24 of the compound element 26 is arranged on the optical axis of the laser light outgoing from the light source 23a, as shown in FIG. 5. Thus the compound prism 24 is made up of a first prism 24a, a second prism 24b bonded via a first light polarizing film to the first prism 24a, a third prism bonded via a second light polarizing film to the second prism 24b, and a polarized light selective grating 24d mounted on the third prism 24c. The first light polarizing film operates as a first beam splitter 24e for separating the incident light beam into a transmitted light beam and a reflected light beam, while the second light polarizing film operates as a second beam splitter 24f for separating the incident light beam into a transmitted light beam and a reflected light beam.

Figure 7:
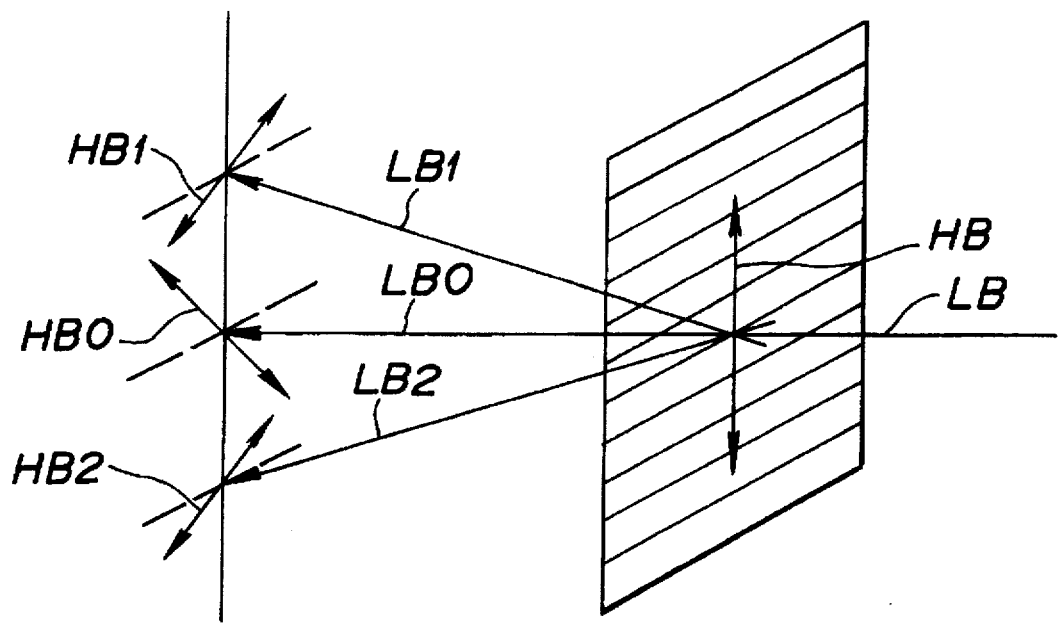
FIG. 7 schematically shows the state of diffraction by a polarized light selective grating of the compound element shown in FIG. 5.

The first beam splitter 24e is arranged on the optical axis of the light incident from the light source 23a on the recording medium 21 and separates the incident light into the transmitted light beam and the reflected light beam while taking out the return light beam at the optical axis of the incident light beam. The second beam splitter 24f is arrayed on the optical axis of the return light taken out by the first beam splitter 24e for splitting the return light into a transmitted light beam transmitted through the second beam splitter 24f and a reflected light beam reflected by the second beam splitter. The direction of splitting of the return light by the second beam splitter 24f is perpendicular to the tracking direction of the recording medium 21, by way of an example. The polarized light selective grating 24d is arranged on the optical path of the return light transmitted through the second beam splitter 24f so that a 0 order light LB0 will have a polarization direction HB0 inclined by +45° relative to the polarization direction HB of the return light LB and so that ±one order light beams LB1, LB2 will have the polarization directions of −45° relative to the polarization direction HB of the return light LB. The grating 24d splits the return light LB into the 0 order light beam LB0 and ±one order light beams LB1, LB2 having the polarization directions perpendicular to the 0 order light beam LB0, as shown in FIG. 7.

The polarization selective grating 24, employed for the compound prism 24, may be formed by forming a grating on a double refraction medium. With this type of the polarization selective grating, the double refraction medium splits the incident light into a normal light beam and an abnormal light beam having different polarized states, while the grating splits the incident light into the 0 order light beam and ±one order light beams by diffraction. The polarization selective grating may, for example, be a polarizing hologram optical element prepared using a hologram technique.

The light receiving portion 25 of the compound element 26 is made up of a first photodetector device 25a, arranged on the optical path of the return light reflected by the second beam splitter 24f, a second photodetector device 25b arranged on the light path of the return light transmitted through the second beam splitter 24f and separated by the polarization selective grating 24d, and a third photodetector device 25c arranged on the light path of the incident light reflected by the first beam splitter 24e, as shown in FIG. 5.

The first photodetector device 25a is a three-segment photodetector, made up of three photodetector segments A, B and C, having light receiving regions extending parallel to the tracking direction T, as shown in FIG. 8. The first photodetector 25a is arranged so that the optical axis of the return light LA reflected by the second beam splitter 24f is coincident with the center of the photodetector segment B. The second photodetector 25b is comprised of a three-segment photodetector DEF, arranged on the light path of the 0 order light beam LB0 generated when the return light LB transmitted through the second beam splitter 24f traverses the polarization selective grating 24d, and photo-detector segments G, H arranged on the light path of the ±one order light beams LB1, LB2, respectively. The second photodetector DEF, arranged on the light path of the 0 order light beam LB0, is a three-segment photodetector made up of three photodetector segments D, E and F having three light receiving regions extending parallel to the tracking direction. The photodetector DEF is arranged so that the light path of the 0 order light beam LB0 is coincident with the center of the photodetector segment E.

With the above-described optical device, a smaller number of components suffices, while the optical path length of the optical system can be reduced. In particular, by integrating the compound prism 24 and the light receiving portion 25 with the compound element 26, it becomes possible to reduce the light path of the optical system and the overall size of the device.

For reading out signals from the recording medium with the above-described optical pickup device, a laser light beam is radiated from the light source 23a, as shown in FIG. 5. The laser light beam is incident on the first prism 24a of the compound prism 24 and split by the first beam splitter 24e into transmitted light beam and a reflected light beam. The reflected light beam is reflected towards the first prism 24a and exits the first prism 24a towards the third photodetector 25c for detection thereby. The third photodetector 25c monitors the power of the laser light beam from the light source 23a and controls the power of the laser light from the light source 23a based upon the detected light volume. Thus, with the present optical pickup device, the laser light power can be set at all times to an optimum level.

On the other hand, the light transmitted through the first beam splitter 24e exits the second prism 24b to fall on the lens 27 as shown in FIG. 4 so as to be converged thereby on the recording surface 21a of the recording medium 21. The incident light on the recording surface 21a of the recording medium 21 is reflected by the recording surface 21a of the recording medium 21 and returned as a return light containing signals from the recording medium 21.

The return light follows the route which is a reversal of that for the incident light and falls on the second prism 24b of the compound prism 24. The return light incident on the second prism 24b is reflected by the first beam splitter 24e in a direction towards the second beam splitter 24f, as shown in FIG. 5. The return light, reflected by the first beam splitter 24e, is separated by the second beam splitter 24f into a return light beam LB transmitted through the second beam splitter 24f and a return light beam LA reflected by the second beam splitter 24f.

The first beam splitter 24e and/or the second beam splitter 24f desirably has an enhancement effect. If the first beam splitter 24e and/or the second beam splitter 24f has an enhancement effect, the return light reflected by these beam splitters are subjected to the enhancement effect, so that it becomes possible to prohibit deterioration of the carrier to noise (C/N) ratio of the signal from the recording medium.

The return light reflected from the second beam splitter 24f is radiated from the second prism towards the first photodetector device 25a so as to be detected by the photodetector segments A, B and C thereof, as shown in FIG. 8.

The return light LB transmitted through the second beam splitter 24f falls on the third prism 24c and is reflected within the prism 24c to exit the prism 24c in a direction towards the second photodetector 25b via the polarization selective grating 24d, as shown in FIG. 5. The return light LB is diffracted by the polarization selective grating 24d and split in this manner into the 0 order light beam LB0 and ±one order light beams LB1, LB2 having the directions of polarization perpendicular to the 0 order light beam LB0. The 0 order light LB0 from the polarization selective grating 24d is detected by the photodetector segments D, E and F of the second photodetector device 25b, while the ±one order light beams LB1, LB2 are detected by photodetector segments G and H of the second photodetector device 25b, as shown in FIG. 8.

Since the tracking direction of the recording medium 21 corresponds to the splitting direction of the return light by the second beam splitter 24f, the arraying direction of the photodetector segments A, B and C, the photodetector segments D, E and F and the photodetector segment H corresponds to a direction perpendicular to the tracking direction T of the recording medium 21, as shown in FIG. 8. The direction of polarization HB0 of the return light incident on the photodetector segments D, E and F is inclined +45° relative to the direction of polarization HA of the return light incident on the photodetector segments A, B and C, while the directions of polarization HB1 and HB2 of the return light incident on the photodetector segments G and H are inclined −45° relative to the direction of polarization HA of the return light incident on the photodetector segments A, B and C, as also shown in FIG. 8.

If the light volumes detected by these photodetector segments A through to H are denoted a through to g, respectively, the focusing error signal FE, specifying the amount of defocusing of the incident light beam on the recording surface 21a of the recording medium 21, the tracking error signal TE, specifying the amount of detracking of the incident light on the recording surface 21a of the recording medium 21 based upon the push-pull method, the photo-magnetic signal MORF and the optical signal CDRF, that is an RF signal from the recording medium 21, may be obtained by the following equations (1-1), (1-2), (1-3) and (1-4), respectively:

$$FE = \{(a+c)-b\}-\{(d+f)-e\} \quad (1\text{-}1)$$

$$TE = a-c \quad (1\text{-}2)$$

$$MORF = (d+e+f)-(g+h) \quad (1\text{-}3)$$

$$CDRF = (d+e+f)+(g+h) \quad (1\text{-}4)$$

It is noted that the pp-value of an S-curve, specifying the relation between the value of the focusing error and the focusing error signal, is determined by the optical path length between the second beam splitter 24f and the polarization selective grating 24d and the longitudinal magnification of the lens 27.

With the above-described optical pickup device, the light volume, from which the photo-magnetic signal MORF and the optical signal CDRF are derived, are detected by the five photodetector segments D through to H. Thus, with the optical pickup device, the number of photodetector segments is small, thus giving an excellent signal/noise (S/N) ratio in detecting the RF signals from the recording medium 21.

In the present embodiment, the direction of diffraction by the polarization selective grating 24d is the same as the splitting direction of the return light by the second beam splitter 24f, while the return light LA reflected by the second beam splitter 24f and the 0 order light beam LB0 as well as the ±one order light beams LB1 and LB2 transmitted through the second beam splitter 24f and diffracted by the grating 24d are arrayed side-by-side. However, this is merely illustrative and the direction of diffraction by the polarization selective grating 24d may be a direction perpendicular to the splitting direction of the return light by the second beam splitter 24f, while the photodetector segments G and H of the second photodetector 25b may be arrayed on both sides of the photodetector segments D, E and F.

Second Embodiment

The optical pickup device of the present embodiment is based upon a three-spot method for detecting the tracking error by three laser light beams incident on a recording medium, and is configured similarly to the optical pickup device of the first embodiment except that it includes a grating for splitting the laser light beam from a light source before incidence thereof on the recording medium into a 0 order light beam and ±one order light beams and a photodetector segment of the first photodetector for detecting the ±one order light beams from the above grating.

Figure 9:
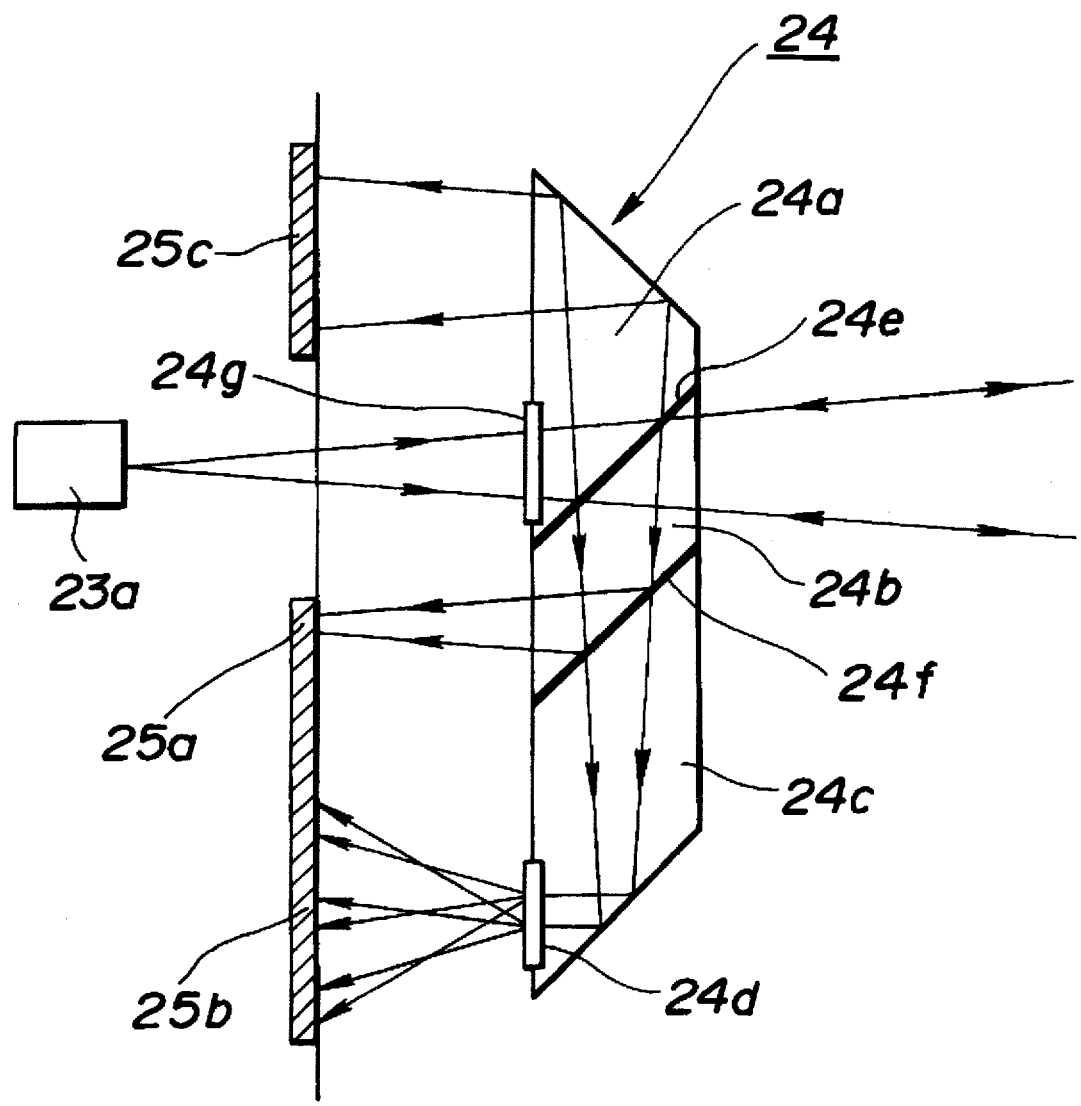
FIG. 9 is a plan view showing a modification of a compound element of an optical pickup device according to the present invention.

That is, the optical pickup device of the present embodiment includes a grating 24g mounted on the bottom surface of the first prism 24a on which falls the laser light beam from the light source 23a, and photodetector segments I and J on both sides of the photodetector segments A, B and C of the first photodetector device 25a, that is on the light path of the return light reflected by the grating 24g, or the ±order light beam reflected by the grating 24g, as shown for example in FIG. 9.

Figure 10:
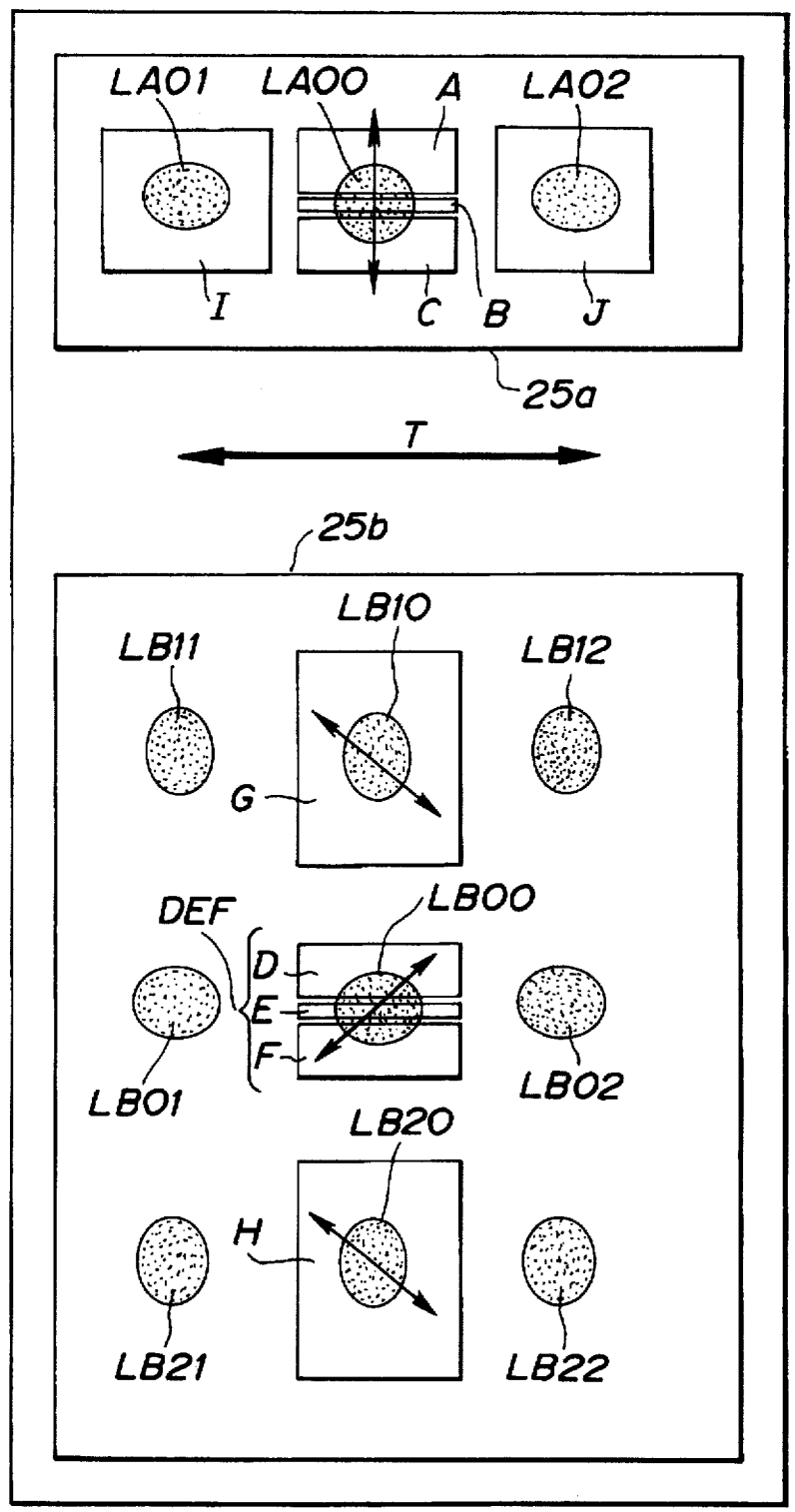
FIG. 10 is an enlarged plan view showing first and second photodetectors of the compound element shown in FIG. 9.

The spot pattern on the first photodetector 25a and on the second photodetector 25b is such that, in the diffracted light diffracted by the grating 24g, the 0 order light beams LA00, LB00, LB10 and LB20 are incident on the segments A, B and C of the photodetector device 25a, segments D, E and F of the second photodetector device 25b and on the segments G and H and, in the diffracted light diffracted by the grating 24g, the ±1 order light beams LA01, LA02, LB01, LB02, LB11, LB12, LB21 and LB22 are incident on both sides of the 0 order light beams LA00, LB00, LB10 and LB20, as shown in FIG. 10. In addition, in the return light reflected by the second beam splitter 24f, the ±one order light beams LA01 and LA02 from the grating 24g are incident on the photodetector segments I and j of the first photodetector device 25b.

The optical pickup device of the second embodiment is similar to the first embodiment with respect to the RF signals and the focusing error signals from the recording medium However, as for the tracking error signal, the tracking error signal TE derived form the three-spot method and a push-pull signal PP derived from the push-pull method may be taken out in the present second embodiment. That is, if the light volumes detected by the photodetectors A, C, I and J are denote a, c, i and j, the tracking error signal TE derived from the three spot method and the push-pull signal derived from the push-pull method may be obtained by the following equations (2-1) and (2-2), respectively:

$$TE=i-j \quad (2\text{-}1)$$

$$PP=a-c \quad (2\text{-}2)$$

Third Embodiment

The optical pickup device of the present embodiment is configured for splitting the return light from the recording medium and detecting the split portions of the return light from the recording medium. The optical pickup device of the present embodiment is similar to the optical pickup device of the first embodiment except that the photodetector pattern of the light receiving portion of the compound element is modified as a result of such splitting of the return light by the grating.

Figure 11:
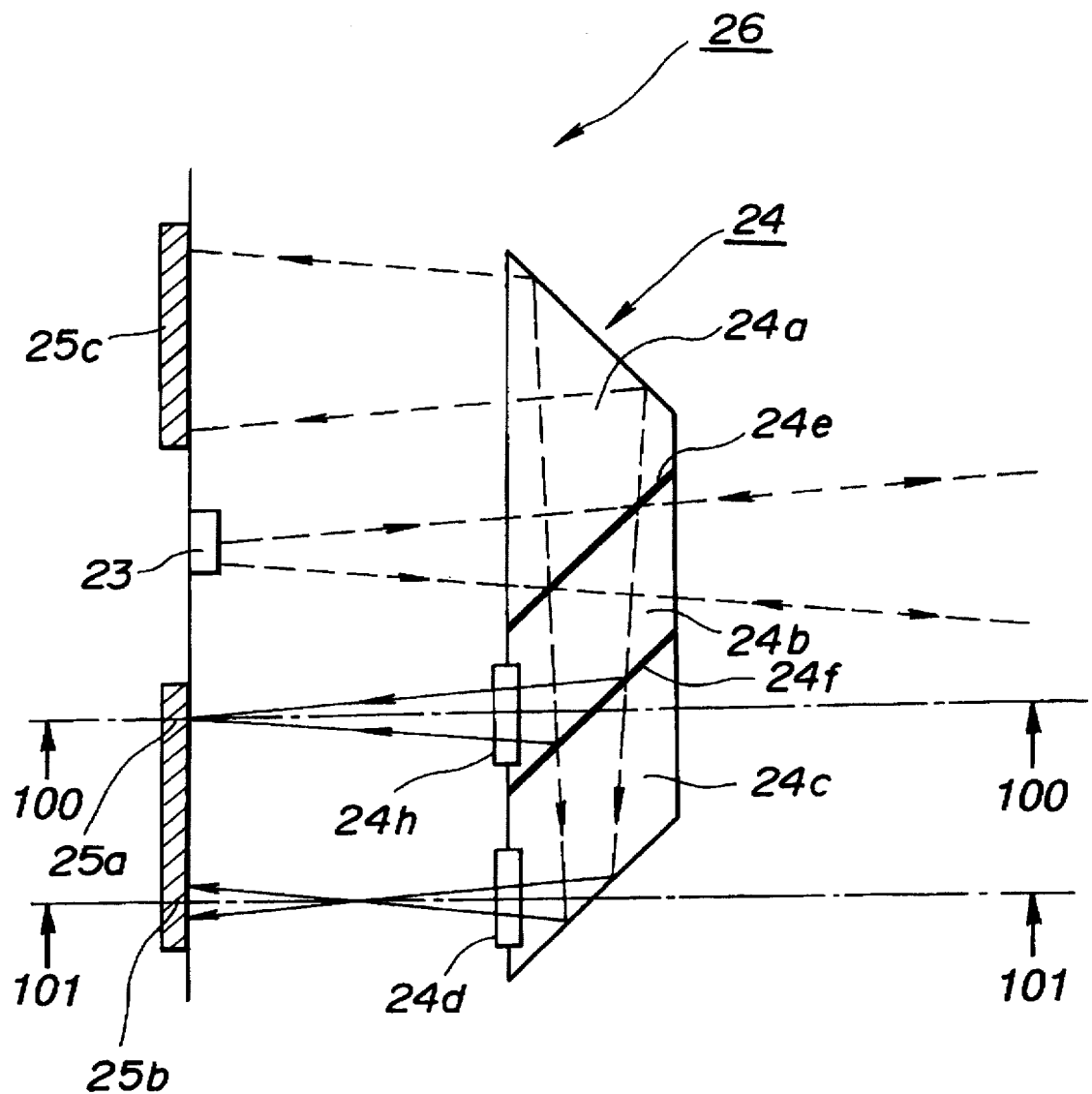
FIG. 11 is a plan view showing a further modification of a compound element of an optical pickup device according to the present invention.
Figure 12:
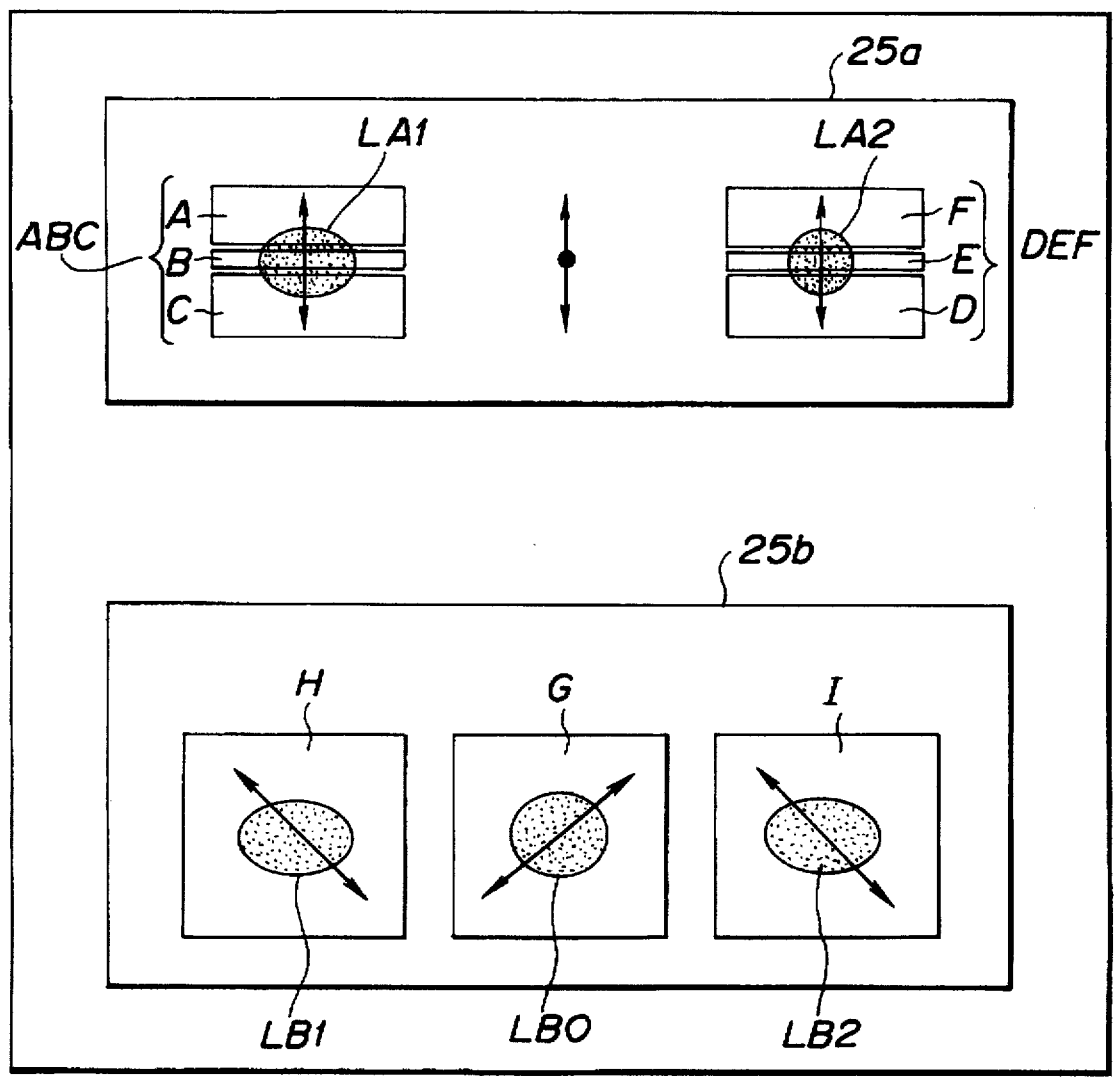
FIG. 12 is an enlarged plan view showing first and second photodetectors of the compound element shown in FIG. 11.

That is, the optical pickup device of the present embodiment has a grating 24h mounted on the bottom surface of the second prism 24b of the compound prism 24 on the light path of the return light reflected by the second beam splitter 24f, as shown in FIG. 11. The compound element 26 has a first photodetector device 25a and a second photodetector device 24b, as shown in FIG. 12. The first photodetector 25a has two photodetectors ABC and DEF on the light paths of the ±one order light beams LA1, LA2 from the grating 24h, while the second photodetector device 24b has a photodetector segments G on the light path of the 0 order light beam LB0 from the polarization selective grating 24d and photodetector segments H and I on the light paths of the ±one order light beams LB1 and LB2 from the polarization selective grating 24d, respectively. The photodetectors ABC and DEF of the first photodetector device 25a are each three-segment photodetectors having the light receiving regions extending parallel to one another, and are each comprised of three photodetector segments A, B and C and three photodetector segments D, E and F, respectively. The photodetector device 25a is so arranged that the light paths of the ±one order light beams LA2 and LA2 from the grating 24h coincide with the centers of the photodetectors B and E, respectively.

Figure 13:
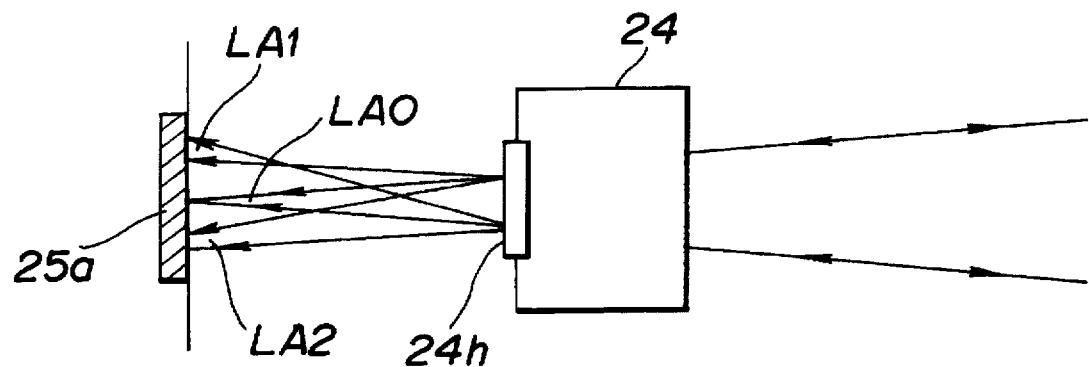
FIG. 13 is a side view showing the state of diffraction by a grating of the compound element shown in FIG. 11, looking from the direction of arrow 100 in FIG. 11.
Figure 14:
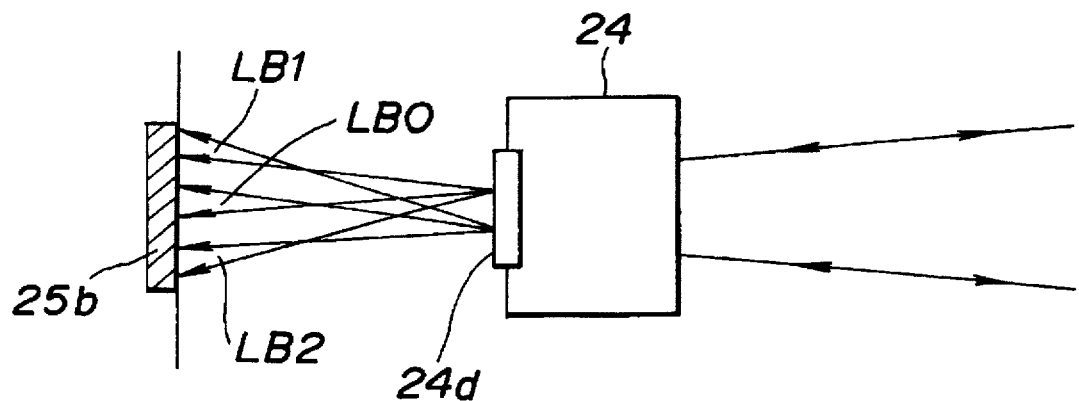
FIG. 14 is a side view showing the state of diffraction by a polarized light selective grating of the compound element shown in FIG. 11, looking from the direction of arrow 101 in FIG. 11.

Referring to FIG. 13, showing the compound element 26 in a direction of arrow 100 in FIG. 11 and in a direction of arrow 101 in FIG. 11, the direction of diffraction by the grating 24h, that is the direction in which the +one order light beam LA1, 0 order light beam LA0 and the −1 order light beam LA2 from the grating 24h are arrayed, is set so as to be the same as the direction of diffraction by the grating 24d, that is the direction in which the +one order light beam LB1, 0 order light beam LB0 and the 1 order light beam LB2 from the grating 24d are arrayed, and these diffraction directions are set so as to be perpendicular to the splitting direction of the return light by the second beam splitter 24f. Thus the light receiving portion 25 of the compound element 26 is arranged so that the photodetector segments are in register with these light beams, that is so that the segments A, B and c and the segments D, E and F are arrayed transversely and the segments H, G and I of the second photodetector device 25b are arrayed transversely in this order below the first photodetector device 25a, as shown in FIG. 12.

Consequently, the spot pattern on the first photodetector device 25a and the second photodetector device 25b is such that, in the diffracted light by the grating 24h, the ±one order light beams LA1, LA2 are incident on the photodetectors ABC and the photodetectors DEF of the first photodetector device 25a, and that, in the diffracted light by the grating 24d, the 0 order light beam LA0 is incident on the photodetector segment G of the second photodetector device 25b, whereas, in the diffracted light by the grating 24d, the ±one order light beams LA1 and LB2 are incident on the photodetector segments H and I of the second photodetector device 25b, as shown in FIG. 12.

If, with the above-described optical pickup device, the light volumes detected by the photodetector segments A through to I are denoted a through to i, respectively, the focusing error signal FE, tracking error signal TE derived from the push-pull method, photo-magnetic signal MORF and the optical signal CDRF, are obtained by the following equations (3-1), (3-2), (3-3) and (3-4), respectively:

$$FE = \{(a+c)-b\} - \{(d+f)-e\} \quad (3\text{-}1)$$

$$TE = (a-c) + (d-f) \quad (3\text{-}2)$$

$$MORF = g - (h+i) \quad (3\text{-}3)$$

$$CDRF = g + (h+i) \quad (3\text{-}4)$$

In the optical pickup device of the instant embodiment, the light volume, based on which the photo-magnetic signal MORF and the optical signal CDRF are produced, are detected by the three photodetector segments G, H and I. Thus, with the optical pickup device, the number of photodetector segments is small, thus giving an excellent signal/noise (S/N) ratio in detecting the RF signals from the recording medium.

Fourth Embodiment

Figure 15:
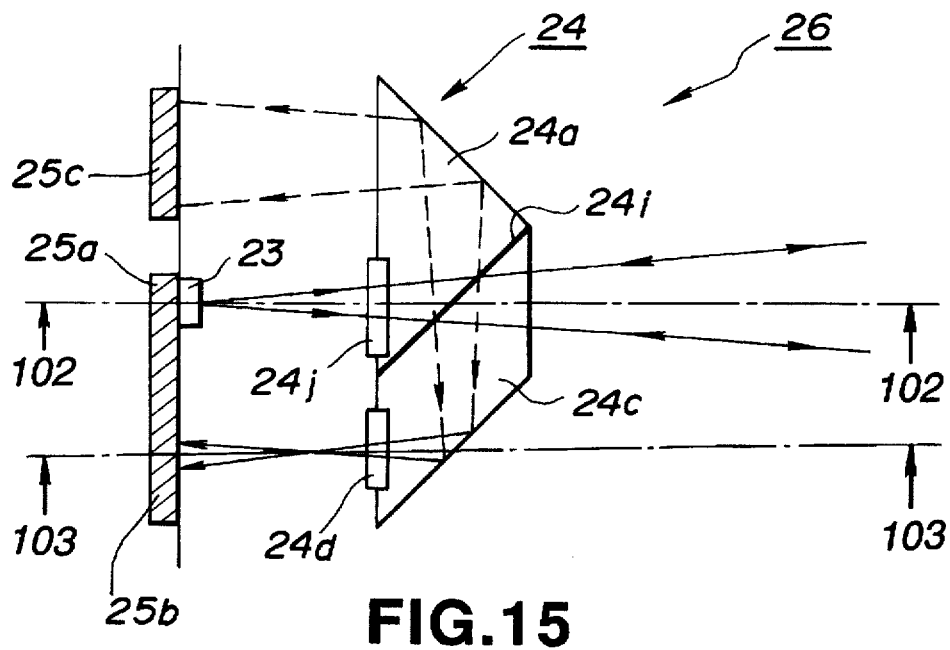
FIG. 15 is a plan view showing a still further modification of a compound element of an optical pickup device according to the present invention.
Figure 16:
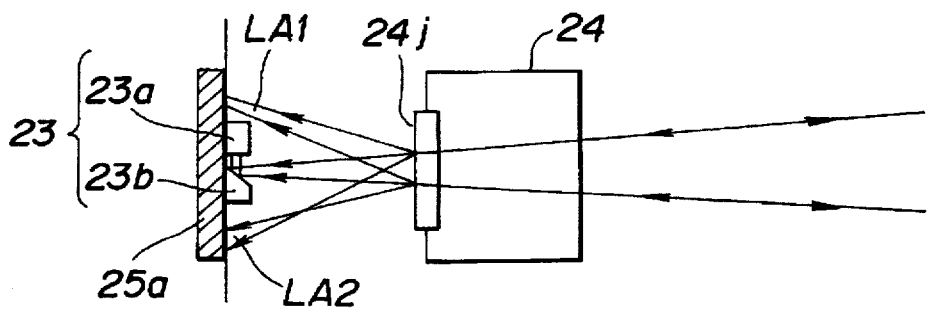
FIG. 16 is a side view showing the state of diffraction by a grating of the compound element shown in FIG. 15, looking from the direction of arrow 102 in FIG. 15.
Figure 17:
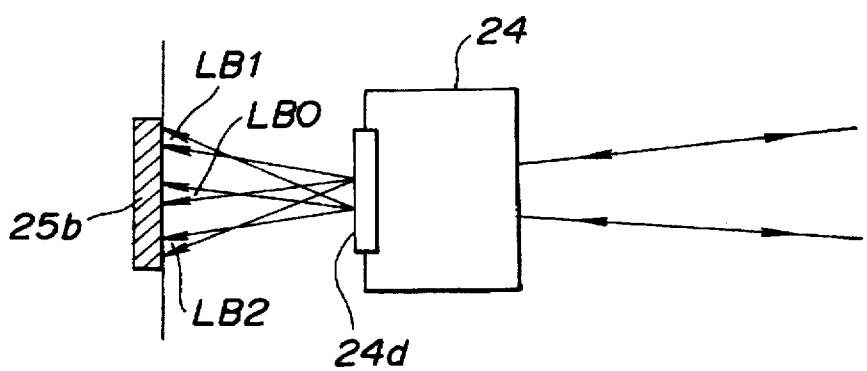
FIG. 17 is a side view showing the state of diffraction by a polarized light selective grating of the compound element shown in FIG. 15, looking from the direction of arrow 103 in FIG. 15.

Referring to FIGS. 15–17, the optical pickup device of the present fourth embodiment is provided with only one beam splitter, and is configured similarly to the optical pickup device of the third embodiment except that the second prism is removed from the compound prism and the first prism is directly bonded to the third prism, while there is provided only one beam splitter.

The compound prism of the optical pickup device of the instant embodiment has a first prism 24a, a third prism 24c bonded to the first prism 24a via a polarization film, a grating 24h bonded to the first prism 24a and a polarization selective grating 24d bonded to the third prism 24c, as shown in FIG. 15. The polarization film portion between the first prism 24a and the third prism 24d operates as a beam splitter 24i for splitting the incident light beam into a transmitted light portion and a reflected light portion. If only one beam splitter is used in this manner, the compound element 24 may be compact in size and hence the optical pickup device may be reduced in size.

With the above-described arrangement of the compound prism 24, the mounting positions of the first photodetector 25a and the second photodetector 25b of the light receiving portion 25 of the compound element 26 are also changed. That is, the first photodetector device 25a is arranged in the vicinity of the light emitting portion 23, for detecting the diffracted light from the grating 24h, while the second photodetector device 25b is arranged so as to be closer to the light emitting portion 23 than in the third embodiment for detecting the diffracted light from the grating 24d.

The compound element 26 is arranged so that the ±one order light beams LA1 and LA2 from the grating 24j are incident on the photodetectors ABC and DEF of the first photodetector device 25a, while the photodetectors ABC and DEF are arranged on both sides of the light emitting portion 23, as shown in FIG. 16, showing the compound element 26 from the direction of arrow 102 in FIG. 15. The photodetector segments H, G and I are arranged in this order parallel to the photodetectors ABC and DEF of the first photodetector device 25a, so that the 0 order light beam LB0 from the polarization selective grating 24d is incident on the segment G of the second photodetector device 25b and the ±one order light beams LB1 and LB2 from the polarization selective grating 24d are incident on the segments H and I of the second photodetector device 25b, as shown in FIG. 17, showing the compound element 26 from the direction of arrow 103 in FIG. 15.

For reading out signals from the recording medium from the above-described optical pickup device, a laser light beam is radiated from the light emitting portion 23, as shown in FIG. 15. The laser light beam is incident on the first prism 24a of the compound prism 24 and split by the beam splitter 24i into a transmitted light beam and a reflected light beam. The reflected light beam is reflected within the first prism 24a as in the first embodiment and radiated from the first prism 24a towards the third photodetector device 25c for detection thereby. The light beam transmitted through the beam splitter 24i exits the third prism 24c. Similarly to the outgoing light from the second prism 24b in the above-described embodiment, the outgoing light from the third prism 24c is incident on the recording medium 21 and reflected by the recording surface 21a of the recording medium 21. The reflected light is a return light containing the signals from the recording medium 21.

This return light is incident on the third prism 24c by following the route reversed from that of the incident light. The return light incident on the third prism 24c is split by the beam splitter 24i into the return light transmitted through the beam splitter 24i and the return light reflected by the beam splitter 24i.

The return light transmitted through the beam splitter 24i exits the third prism 24c in a direction towards the first photodetector device 25a via the grating 24j. The return light is split into the 0 order light beam and ±one order light beams LA1 and LA2, by diffraction by the grating 24h. The ±one order light beams are detected by the photodetectors ABC and DEF of the first photodetector 25a, respectively, as shown in FIG. 15.

The return light reflected by the beam splitter 24i is reflected within the third prism 24c, and exits the third prism 24c in a direction towards the second photodetector device 25b via the polarization selective grating 24d, as shown in FIG. 15. The return light is split into the 0 order light beam LB0 and ±one order light beams LB1 and LB2 having the polarization direction perpendicular to the 0 order light beam LB0 by diffraction by the polarization selective grating 24d, as shown in FIG. 17. The 0 order light beam LB0 and the ±one order light beams LB1 and LB2 from the polarization selective grating 24d are detected by the segment G of the second photodetector device 25b and by the segments H and I of the second photodetector device 25b, respectively.

With the optical pickup device of the present embodiment, the focusing error signal FE, tracking error signal MORF and the optical signal CDRF may be produced as in the third embodiment.

What is claimed is:

1. An optical pickup device for reading out a signal from a recording medium by radiating a light beam to the recording medium and by detecting a return light reflected from the recording medium, comprising:

light emission means;

first beam splitting means arranged on the light path of an incident light radiated by said light emission means and incident on the recording medium for taking out a return light beam from the light path of the incident light;

second beam splitting means arranged on the light path of the return light beam split by said first beam splitting means for splitting the return light into two return light beams;

first detection means for detecting one of the return light beams split by said second beam splitting means;

polarization selective optical means arranged on the light path of the other return light beams split by said second beam splitting means for splitting the other return light beam into plural light beams having different polarized states; and second detection means for detecting the plural light beams split by said optical means.

2. The optical pickup device as claimed in claim 1 wherein said first detection means and said second detection means are arranged in the same plane.

3. The optical pickup device as claimed in claim 1 wherein said polarization selective optical means splits the other return light beam into a 0 order light beam, a +one order light beam and a −one order light beam.

4. The optical pickup device as claimed in claim 3 wherein said first detection means include a three-segment detector for detecting the 0 order light beam, a detector for detecting the +1 order light beam and a detector for detecting the −one order light beam.

5. The optical pickup device as claimed in claim 1 wherein said second detection means include a three-segment detector for detecting the 0 order light beam, a detector for detecting the +1 order light beam and a detector for detecting the −one order light beam.

6. The optical pickup device as claimed in claim 1 wherein the first detection means comprises a three-segment detector.

7. The optical pickup device as claimed in claim 1 further comprising second polarization selective optical means between said light emission means and said first beam splitting means for further splitting into plural light beams having different polarization states.

8. The optical pickup device as claimed in claim 1 further comprising second polarization selective optical means between said second beam splitting means and said first detection means for further splitting into plural light beams having different polarization states.

9. The optical pickup device as claimed in claim 8 wherein said first detection means comprises a first three-segment detector for detecting the +one order light beam and a second three-segment detector for detecting the −one order light beam.

10. An optical pickup device for reading out a signal from a recording medium by radiating a light beam to a recording medium and by detecting a return light reflected from the recording medium, comprising:

light emission means;

first beam splitting means arranged on the light path of an incident light radiated by said light emission means and incident on the recording medium for taking out a return light from the light path of the incident light;

first optical means provided between said first beam splitting means and said light emission means for splitting the return light beam into plural light beams having different polarized states;

first detection means provided adjacent to said light emission means for detecting the plural light beams having different polarized states;

second beam splitting means arranged on the light path of the return light split by said first beam splitting means for guiding the return light beam to second detection means; and second optical means provided between said second detection means and said second beam splitting portion for splitting the return light beam guided thereto into plural light beams having different polarized states.

11. An optical apparatus for reading out a signal from a recording medium by radiating a light beam to a recording medium and by detecting a return light beam reflected from the recording medium, comprising:

light emission means;

first beam splitting means arranged on the light path of an incident light radiated by said light emission means and incident on the recording medium for taking out the return light beam from the light path of the incident light;

second beam splitting means arranged on he light path of the return light beam split by said first beam splitting means for splitting the return light beam into two return light beams;

first detection means comprised of a three-segment detector ABC for detecting one of the return light beams split by said second beam splitting means;

polarization selective optical means arranged on the light path of the other return light beam split by said second beam splitting means for splitting the other return light beam into a 0 order light beam, a +one order light beam and a −one order light beam having different polarized states;

second detection means comprised of a three-segment detector DEF, a detector G and a detector H for the 0-order light beam, +one order light beam and the −one-order light beam having different polarized states, respectively; and arithmetic means for executing arithmetic operations for finding a focusing error signal FE={(a+c)−b}−{(d+f)−e}, a tracking error signal TE=a−c, a photo-magnetic signal MORF=(d+e+f)−(g+h) and an optical signal CDRF=(d+e+f)+(g+h), where a, b, c, d, e, f, g and h denote light volumes detected by said detectors A, B, C, D, E, F, G and H, respectively.

12. The optical apparatus as claimed in claim 11 further comprising:

second optical means between said light emission means and said first beam splitting means for further splitting into a 0-order light beam, a +one order light beam and a −one order light beam having different polarized states;

said first detection means having a three-segment detector for detecting the one return light beam split by said second beam splitting means;

a three-segment detector ABC for detecting the 0-order light beam; a detector I for detecting the +one order light beam; and a detector J for detecting the −one order light beam; said arithmetic means executing arithmetic operations for finding the tracking error TE=i−j and a push-pull signal PP=a−c.

13. An optical apparatus for reading out a signal from a recording medium by radiating a light beam to a recording medium and by detecting a return light reflected from the recording medium, comprising:

light emission means;

first beam splitting means arranged on the light path of an incident light radiated by said light emission means and incident on the recording medium for taking out the return light beam from the light path of the incident light;

second beam splitting means arranged on the light path of the return light split by said first beam splitting means for splitting the return light beam into two return light beams;

polarization selective first optical means for splitting one of the return light beams split by said first beam splitting means into a 0-order light beam, a +one order light beam and a −one-order light beam having different polarized states;

first detection means having a first three-segment detector ABC for detecting the +one order light beam split by said first optical means and a second three-segment detector DEF for detecting the −one order light beam split by said first optical means;

polarization selective second optical means provided on the light path of the other return light beam split by said second beam splitting means for splitting the other return light beam into a 0-order light beam, a +one order light beam and a −one-order light beam having different polarized states;

second detection means having detectors G, H, I for detecting the 0-order light beam, +one order light beam and the −one order light beam as split by said second optical means; and arithmetic means for executing arithmetic operations for finding a focusing error signal FE={(a+c)−b}−{(d+f)−e}, a tracking error signal TE=(a−c)+(d−f), a photomagnetic signal MORF=g−(h+i) and an optical signal CDRF=g+(h+i), where a, b, c, d, e, f, g h, and i denote light volumes detected by said detectors A, B, C, D, E, F, G, H and I, respectively.

14. An optical pickup device for reading out a signal from a recording medium by radiating a light beam to the recording medium and by detecting a return light reflected from the recording medium, comprising:

light emission means for emitting a light beam;

first beam splitting means arranged on the light path of an incident light beam radiated by the light emission means and incident on the recording medium for transmitting a portion of the incident light beam to the recording medium and reflecting a first return light beam reflected by the recording medium;

second beam splitting means arranged on the light path of the first return light beam after it is reflected by the first beam splitting means for transmitting one portion of the first return light beam as a second return light beam and reflecting another portion of the first return light beam as a third return light beam;

first detection means for detecting the third return light beam;

polarization selective first optical means arranged on the light path of the second return light beam for dividing the second return light beam into a first set of plural light beams having different polarized states; and second detection means for detecting the first set of plural light beams split by the polarization selective first optical means.

15. The optical pickup device as claimed in claim 14 wherein the first detection means and the second detection means are arranged in the same plane.

16. The optical pickup device as claimed in claim 14 wherein first set of plural light beams includes a 0 order light beam, a +one order light beam and a −one order light beam.

17. The optical pickup device as claimed in claim 16 wherein the second detection means include a three-segment detector for detecting the 0 order light beam, a detector for detecting the +1 order light beam and a detector for detecting the −one order light beam.

18. The optical pickup device as claimed in claim 14 further comprising polarization selective second optical means provided between the first beam splitting means and the light emission means for splitting the incident light beam radiated by the light emission means into a second set of plural light beams, including a 0-order light beam, a +one order light beam and a −one order light beam, having different polarized states before the second set of plural light beams are incident upon the recording medium.

19. The optical pickup device as claimed in claim 18 wherein the first detection means includes a three-segment detector ABC for detecting the 0 order light beam, a detector I for detecting the +1 order light beam and a detector J for detecting the −one order light beam of the second set of plural light beams after they are reflected by the recording medium.

20. The optical apparatus as claimed in claim 19, wherein:
the following signals can found by combining the light volumes a, c, i, j detected by the detectors A, C, I, and J, respectively: the tracking error TE=i−j and a push pull signal PP=a−c.

21. The optical pickup device as claimed in claim 14 further comprising polarization selective second optical means between the second beam splitting means and the first detection means for further splitting the third return light beam into a second set of plural light beams, including a one order light beam and a −one order light beam.

22. The optical pickup device as claimed in claim 21 wherein the first detection means includes two three-segment detectors.

23. The optical pickup device as claimed in claim 14 further comprising a compound prism which includes a first element, a second element and a third element and wherein the first beam splitting means is constituted of a first light polarizing film bonding together the first element and the second element and the second beam splitting means is constituted of a second light polarizing film bonding together the second element and the third element.

24. An optical pickup device for reading out a signal from a recording medium by radiating a light beam to a recording medium and by detecting a return light beam reflected from the recording medium, comprising:

light emission means;

first beam splitting means arranged on the light path of an incident light beam radiated by the light emission means and incident on the recording medium for splitting out a return light beam from the light path of the incident light beam;

polarization selective first optical means provided between the first beam splitting means and the light emission means for splitting the incident light beam radiated by the light emission means into a first set of incident plural light beams, including a 0-order light beam, a +one order light beam and a −one order light beam, having different polarized states, before the first set of incident plural light beams impinge upon the recording medium, wherein the first set of incident plural light beams are reflected from the recording medium as a first set of return plural light beams and are split by the first beam splitting means from the first set of incident plural light beams;

second beam splitting means arranged on the light path of the first set of return plural light beams for transmitting one portion of the first set of return plural light beams as a second set of return plural light beams and reflecting another portion of the first set of return plural light beams as a third set of return plural light beams;

first detection means for detecting the third set of return plural light beams;

polarization selective second optical means for splitting the second set of return plural light beams guided thereto into a fourth set of return plural light beams having different polarized states; and second detection means for detecting the fourth set of return plural light beams.

25. The optical pickup device as claimed in claim 24 further comprising a compound prism which includes a first element, a second element and a third element and wherein the first beam splitting means is constituted of a first light polarizing film bonding together the first element and the second element and the second beam splitting means is constituted of a second light polarizing film bonding together the second element and the third element.

26. An optical pickup device for reading out a signal from a recording medium by radiating a light beam to a recording medium and by detecting a return light beam reflected from the recording medium, comprising:

light emission means;

beam splitting means arranged on the light path of an incident light beam radiated by the light emission means and incident on the recording medium for transmitting a portion of the incident light beam to the recording medium, transmitting a portion of the return light beam reflected by the recording medium and reflecting a portion of the return light beam reflected by the recording medium;

polarization selective first optical means provided between the beam splitting means and the light emission means for splitting the portion of the return light beam which is transmitted by the beam splitting means into a first set of return plural light beams, including a +one order light beam and a −one order light beam, having different polarized states;

first detection means arranged next to the light emission means for detecting the first set of return plural light beams;

polarization selective second optical means for splitting the portion of the return light beam which is reflected by the beam splitting means into a second set of return plural light beams having different polarized states; and second detection means for detecting the second set of return plural light beams.

27. The optical pickup device as claimed in claim 26 further comprising a compound prism which includes a first element and a second element and wherein the beam splitting means is constituted of a light polarizing film bonding together the first element and the second element.

28. An optical apparatus for reading out a signal from a recording medium by radiating a light beam to a recording medium and by detecting a return light beam reflected from the recording medium, comprising:

light emission means;

first beam splitting means arranged on the light path of an incident light beam radiated by the light emission means for transmitting a portion of the incident light beam to the recording medium and reflecting a first return light beam reflected by the recording medium;

second beam splitting means arranged on the light path of the first return light beam after it is reflected by the first beam splitting means for transmitting one portion of the first return light beam as a second return light beam and reflecting another portion of the first return light beam as a third return light beam;

first detection means comprised of a three-segment detector ABC for detecting the third return light beam split by the second beam splitting means;

polarization selective optical means arranged on the light path of the second return light beam for splitting the second return light beam into a 0 order light beam, a +one order light beam and a −one order light beam having different polarized states;

second detection means comprised of a three-segment detector DEF, a detector G and a detector H for detecting the 0-order light beam, the +one order light beam and the −one-order light beam having different polarized states, respectively; and wherein the following signals can be found by combining the light volumes a, b, c, d, e, f, g and h detected by the detectors A, B, C, D, E, F, G and H, respectively:

a focusing error signal FE={(a+c)−b}−{(d+f)−e}, a tracking error signal TE=a−c, a photo-magnetic signal MORF=(d+e+f)−(g+h) and an optical signal CDRF=(d+e+f)+(g+h).

29. An optical apparatus for reading out a signal from a recording medium by radiating a light beam to a recording medium and by detecting a return light reflected from the recording medium, comprising:

light emission means;

first beam splitting means arranged on the light path of an incident light beam radiated by the light emission means and incident on the recording medium for splitting out the return light beam from the light path of the incident light beam;

second beam splitting means arranged on the light path of the return light beam split by the first beam splitting means for splitting the return light beam into two return light beams;

polarization selective first optical means for splitting one of the return light beams split by the first beam splitting means into a +one order light beam and a −one-order light beam having different polarized states;

first detection means having a first three-segment detector ABC for detecting the +one order light beam split by the first optical means and a second three-segment detector DEF for detecting the −one order light beam split by the first optical means;

polarization selective second optical means provided on the light path of the other return light beam split by the second beam splitting means for splitting the other return light beam into a 0-order light beam, a +one order light beam and a −one-order light beam having different polarized states;

second detection means having detectors H, G and I for detecting the 0-order light beam, +one order light beam and the −one order light beam as split by the second optical means; and wherein the following signals can be found by combining the light volumes a, b, c, d, e, f, g, h and i detected by the detectors A, B, C, D, E, F, G, H and I, respectively:

a focusing error signal FE={(a+c)−b}−{(d+f)−e}, a tracking error signal TE=(a−c)+(d−f), a photo-magnetic signal MORF=g−(h+i) and an optical signal CDRF=g+(h+i).

* * * * *

UNITED STATES PATENT AND TRADEMARK OFFICE
CERTIFICATE OF CORRECTION

PATENT NO. : 5,684,780
DATED : November 4, 1997
INVENTOR(S) : NOBUHIKO ANDO

It is certified that error appears in the above-identified patent and that said Letters Patent is hereby corrected as shown below:

In Col. 14, Line 19, replace "he" with --the--.

Signed and Sealed this

Nineteenth Day of May, 1998

Attest:

BRUCE LEHMAN

Attesting Officer

Commissioner of Patents and Trademarks